United States Patent [19]

Decker et al.

[11] Patent Number: 5,328,980
[45] Date of Patent: Jul. 12, 1994

[54] METHOD OF PREPARING POLY(ARYLENE SULFIDE) POLYMERS, POLYMERS AND POLYMER BLENDS

[75] Inventors: Owen H. Decker, Reading, Pa.; Michael C. Yu, Bartlesville, Okla.

[73] Assignee: Phillips Petroleum Company, Bartlesville, Okla.

[21] Appl. No.: 984,814

[22] Filed: Dec. 3, 1992

[51] Int. Cl.$^5$ ................................................. C08G 75/02
[52] U.S. Cl. ...................................... 528/388; 525/537
[58] Field of Search ......................... 528/388; 525/537

[56] References Cited

U.S. PATENT DOCUMENTS

| | | | |
|---|---|---|---|
| 3,274,165 | 9/1966 | Lenz et al. | 260/79 |
| 3,919,177 | 11/1975 | Campbell | 528/388 |
| 3,940,375 | 2/1976 | O'Shaughnessy et al. | 260/79.1 |
| 4,292,416 | 9/1981 | Shue et al. | 525/420 |
| 4,528,346 | 7/1985 | Sugie et al. | 525/523 |
| 4,544,735 | 10/1985 | Geibel et al. | 528/374 |
| 4,605,732 | 8/1986 | Heitz | 528/388 |
| 4,760,127 | 7/1988 | Ebert et al. | 528/388 |
| 4,760,128 | 7/1988 | Ebert et al. | 528/388 |
| 4,841,018 | 6/1989 | Gaughan | 528/388 |
| 5,039,572 | 8/1991 | Bobsein et al. | 428/408 |

FOREIGN PATENT DOCUMENTS 89226867 9/1989 Japan ................................. 149/34

OTHER PUBLICATIONS

Journal of Polymer Science, vol. 58, pp. 351–367 (1962), Lenz et al. "Phenylene Sulfide Polymer. III. The Synthesis of Linear Polyphenylene Sulfide".
Plastics Technology, pp. 67–75, Feb. 1989.
Chem. Abstract 112, (5) 57038d (1990).
Chem. Abstract 112, 12 99543r (1990).

*Primary Examiner*—Melvyn I. Marquis
*Assistant Examiner*—Helen F. Lee
*Attorney, Agent, or Firm*—Marianne H. Michel

[57] ABSTRACT

A process for preparing arylene sulfide polymers is provided, comprising contacting an initiator compound, a halothiophenol compound, an polar organic compound, and a base. Blends comprising the inventive polymers and polyamides or polyaramides provide improved mechanical properties.

15 Claims, No Drawings

METHOD OF PREPARING POLY(ARYLENE SULFIDE) POLYMERS, POLYMERS AND POLYMER BLENDS

BACKGROUND OF THE INVENTION

This invention relates to poly(arylene sulfide) polymers, methods for their production, and blends employing the polymers.

Engineering resins commonly produced exhibit good stiffness and heat resistance, while elastomers display good flexibility and toughness. Work has been done to blend these polymers to produce polymer alloys with the desired combined characteristics. Often the polymers to be blended are immiscible materials and a compatibilizer is required.

It would be desirable to develop a process for preparing arylene sulfide polymers having non-equivalent functional end groups. Such polymers would be useful as compatibilizers in polymer blends, as surface active agents, or for the preparation of di- or tri- block arylene sulfide copolymers.

SUMMARY OF THE INVENTION

An object of this invention is to provide a process for preparing arylene sulfide polymers.

Another object of this invention is to provide improved polymers.

Another object of this invention is to provide improved polymer blends.

In accordance with this invention, a process for preparing arylene sulfide polymers is provided, comprising contacting an initiator compound, a halothiophenol compound, a polar organic compound, and a base. In accordance with other aspects of this invention polymers and polymer blends comprising polymers produced by the above described process are provided.

DETAILED DESCRIPTION OF THE INVENTION

The initiator compound is represented by the formula $XR(SR)_nY$, where R is a divalent hydrocarbon radical selected from arylene, alkyl-substituted arylene, cycloalkyl-substituted arylene, and aryl-substituted arylene having 6 to 24 carbon atoms; n is 0–5; X is a halogen selected from fluorine, chlorine, bromine, and iodine; and Y is $-NH_2$, $-OH$, or $-COOH$ with the proviso that when Y is $-NH_2$, n is 1-5.

Examples of some initiator compounds which can be employed in the process of this invention include 4-bromobenzoic acid, 4-chlorobenzoic acid, 4-iodobenzoic acid, 4-(4'-bromophenylthio)benzoic acid, 4-bromophenol, 4-chlorophenol, 4-iodophenol, 4-(4'-chlorophenylthio)benzoic acid, 4-(4'-iodophenylthio)benzoic acid, 4-(4''-bromophenylthio-4'-phenylthio)benzoic acid, 4-(4''-chlorophenylthio-4'-phenylthio)benzoic acid, 4-(4''-iodophenylthio-4'-phenylthio)benzoic acid, 4-(4'-bromophenylthio)phenylamine, 4-(4'-chlorophenylthio)phenylamine, 4-(4''-bromophenylthio-4'-phenylthio)phenylamine, 4-(4''-chlorophenylthio-4'-phenylthio)phenylamine, and 4-(4''-iodophenylthio-4'-phenylthio)phenylamine. Phenylamines are preferred, 4(4'-bromophenylthio)phenylamine and 4-(4''-bromophenylthio-4'-phenylthio)phenylamine are most preferred.

Initiator compounds containing single phenyl groups represented by the formula $XR(SR)_nY$ as described above wherein n is 0, are commercially available. Initiator compounds containing two phenyl groups as described above, wherein n is 1, can be prepared by contacting X'RY; X'RX'; a base; and a polar organic compound; wherein each X' is selected from $-Cl$, $-Br$, $-I$, $-F$, and $-SH$ and where Y is selected from $-NH_2$, $-OH$, or $-COOH$. For example, a monohalobenzene containing the appropriate functional radical ($-NH_2$, $-OH$ or $-COOH$), a halothiophenol, a base, and a polar organic compound can be employed. Initiators containing two phenyl groups can also be prepared by contacting a thiophenol compound containing the appropriate Y-functional radical, a p-dihalobenzene, a base, and a polar organic compound. Initiators containing three phenyl groups wherein n is 2, can be prepared by contacting a thiophenol compound containing the appropriate Y-functional radical, a 4-(4'-halophenylthio)halobenzene compound, a base, and a polar organic compound. The 4-(4'-halophenylthio)halobenzene compound can be prepared by reacting phenyl sulfide and $X_2$ (halogen) dissolved in $CCl_4$ at a temperature of about 10°-20° C. Suitable bases, polar organic compounds, and their relative amounts include those described below. In preparing the initiator compound, the relative amounts of the phenyl-containing compounds are generally in the range of from about 0.2 to about 2.0 moles of phenyl compound containing the Y-functional radical per mole of phenyl compound without the Y-functional radical. Optionally an alkali metal carboxylate can be employed as described below. Reaction conditions can vary broadly and include a time, temperature, and pressure sufficient to produce the initiator compound. Generally the temperature is within the range of about 50° C. to about 150° C. and the time is within the range of about 30 minutes to about 12 hours.

The amount of initiator compound employed can vary broadly. Generally the moles of initiator compound per mole of halothiophenol monomer is in the range of from about 0.001 to about 2, preferably from 0.01 to 1.5 moles of initiator compound per mole of halothiophenol monomer.

Halothiophenols which can be used in the process of this invention are represented by the formula XR'SH, where R' is a divalent hydrocarbon radical selected from arylene, alkyl-substituted arylene, cycloalkyl-substituted arylene, and aryl-substituted arylene having 6 to 24 carbon atoms and X is a halogen selected from fluorine, chlorine, bromine, and iodine.

Examples of some halothiophenol compounds which can be employed in the process of this invention include 1-bromo-4-mercaptobenzene (p-bromothiophenol), 1-chloro-4-mercaptobenzene (p-chlorothiophenol), 1-methyl-2-bromo-4-mercaptobenzene, 1-ethyl-2-isopropyl-4-fluoro-5-mercaptobenzene, 1-butyl-2-hexyl-3-chloro-4-mercaptobenzene, 1-decyl-2-bromo-4-mercaptobenzene, 1-tetradecyl-3-iodo-5-mercaptobenzene, 1-bromo-2-cyclohexyl-4-mercaptobenzene, 1-phenyl-2-chloro-3-mercaptobenzene, 1-fluoro-4-mercaptonaphthalene, 4-chloro-4-mercaptobiphenyl, and the like, and mixtures thereof. The preferred halothiophenol compounds for use in this invention are 1-bromo-4-mercaptobenzene (p-bromothiophenol) and 1-chloro-4-mercaptobenzene (p-chlorothiophenol) due to availability and effectiveness.

The polar organic compounds useful in the present invention can be cyclic or acyclic and preferably have 1 to 12 carbon atoms per molecule. Specific examples of such polar organic compounds include formamide, acetamide, N-methylformamide, N,N-dimethylformamide, hexamethylphosphoramide, tetramethylurea, N,N'-ethylenedipyrrolidone, N-methyl-2-pyrrolidone (NMP), 2-pyrrolidone, N-ethylpropionamide, N,N-dipropylbutyramide, caprolactam, N-methylcaprolactam, N-ethylcaprolactam, sulfolane, N,N'-dimethylacetamide, 1,3-dimethyl-2-imidazolidinone, low molecular weight polyamides, and mixtures thereof. N-methyl-2-pyrrolidone (NMP) is especially preferred because of excellent results and ready availability.

The moles of polar organic compound per mole of halothiophenol can vary broadly, generally the polar organic compound is present in the amount of from about 1 to about 24, preferably from about 2 to about 16, and most preferably from 2 to 12 moles of polar organic compound per mole of halothiophenol.

Bases which can be employed include alkali metal hydroxides, alkali metal carbonates, or mixtures thereof. Alkali metal hydroxides which can be employed in the process of this invention include lithium hydroxide, sodium hydroxide, potassium hydroxide, rubidium hydroxide, cesium hydroxide, and mixtures thereof. Lithium hydroxide and sodium hydroxide are preferred. Examples of alkali metal carbonates that can be employed include lithium carbonate, sodium carbonate, potassium carbonate, cesium carbonate, and mixtures thereof. Of the alkali metal carbonates, sodium carbonate and mixtures of sodium carbonate and sodium hydroxide are preferred.

Generally the amount of base is in the range of about 0.6 to about 3.2 moles per mole of halothiophenol, preferably from 1.0 to 2.8 moles of base per mole of halothiophenol.

Optionally an alkali metal carboxylate can be employed. Alkali metal carboxylates which can be employed in the process of this invention can be represented by the formula $R''(CO_2M)_n$ where $R''$ is a hydrocarbyl radical selected from alkyl, cycloalkyl, aryl, and alkaryl, said hydrocarbyl radical having 1 to 20 carbon atoms, n is a number from 1-2, and M is an alkali metal selected from the group consisting of lithium, sodium, potassium, rubidium, and cesium. Preferably, $R''$ is an alkyl radical having 1 to 6 carbon atoms, or a phenyl radical, and M is lithium or sodium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, sodium butanedioate, sodium malonate, sodium glutarate, sodium phthalate, and mixtures thereof. The carboxylate can be prepared in situ by the reaction of the corresponding carboxylic acid with at least one alkali metal hydroxide. The presently preferred alkali metal carboxylate is sodium acetate because of its effectiveness and commercial availability.

The amount of alkali metal carboxylate can vary over a broad range. Generally the moles of alkali metal carboxylate per mole of halothiophenol will be within the range of from about 0.05 to about 4, preferably from about 0.1 to about 2, and most preferably from 0.15 to 1.5 moles of alkali metal carboxylate per mole of halothiophenol.

In certain poly(arylene sulfide) preparations, it is preferable, although not necessary, that water be added to facilitate the reaction. When water is present in a substantial amount, it is preferable, although not necessary, that at least most of the water be removed in a dehydration step, preferably prior to polymerization. In other poly(arylene sulfide) resin preparations, no dehydration is necessary.

Suitable polymerization conditions include a reaction temperature which can vary over a wide range but will generally be within the range of from about 125° C. to about 450° C., preferably from 175° C. to 350° C. The reaction time will be within the range of about 10 minutes to about 72 hours and preferably 1 hour to 12 hours. The pressure need be only sufficient to maintain the halothiophenol compound and the organic amide substantially in the liquid phase.

The arylene sulfide polymers can be separated from their reaction mixture by any method known to those of ordinary skill in the art, e.g. by filtration of the polymer, followed by washing with water or by dilution of the reaction mixture with water, followed by filtration and water washing of the polymer. The polymer can then be additionally washed with water and optionally water-miscible solvents such as acetone, methanol, or organic amide in order to remove impurities and by-product salts.

It has been found that the impact strength of polymer blends comprising polyamides or polyaramides can be improved by the presence of an amino-functional poly(arylene sulfide) produced by the above described process employing initiators containing an amine group. Generally the polyamide is present in the range of from about 5 to about 95 weight percent based on the total weight of the polymer. Examples of suitable polyamides include polyaramides, polyacrylamides, nylon-6; nylon-6,6; nylon-6,10; and nylon-6,12. Generally amino-functional poly(arylene sulfide) is present in an amount in the range from about 0.1 to about 95 weight percent, preferably from 1 to 85 weight percent based on the total weight of the polymer blend.

In addition, the polymer blend can include poly(arylene sulfide) produced by any method known in the art. Typical processes are described in U.S. Pat. Nos. 3,919,177; 4,451,643; 4,102,875; and 5,064,936; the disclosure of which is herein incorporated by reference. Typical processes comprise contacting at least one dihaloaromatic, at least one polar organic compound, and at least one sulfur source at polymerization conditions.

The arylene sulfide polymers produced by the present invention can be blended with fillers, pigments, extenders, or other polymers. The polymers can be cured through crosslinking and/or chain extension, e.g., by heating the polymers in the presence of a free oxygen-containing gas, to provide cured products having high thermal stability and good chemical resistance. They are useful in the production of coatings, films, molded objects, and fibers. The polymers would also be useful as compatibilizers in polymer blends, as surface active agents, or for the preparation of di- or tri- block arylene sulfide copolymers.

The following examples will serve to show the present invention in detail by way of illustration and not by way of limitation.

EXAMPLES

Example I demonstrates the preparation of arylene sulfide polymers using various initiators, monomers, acetates, bases, and reaction conditions.

Example II demonstrates the effectiveness of amino-functional poly(phenylene sulfide) for improving Izod impact strength of poly(phenylene sulfide)/nylon blends.

EXAMPLE I

The initiator 4-(4'-bromophenylthio)phenylamine was prepared by charging 1.00 g (8.00 mmol) 4-bromoanaline, 0.575 g (14.38 mmol) sodium hydroxide, 0.590 g (7.19 mmol) sodium acetate, 2 mL water and 18 mL N-methyl-2-pyrrolidone (NMP) to a stainless steel reactor equipped with a stirring device. Heat was applied and liquid (5 mL) was distilled off until the temperature reached about 195° C. The mixture was cooled to 170° C. and a solution of 5.088 g (21.57 mmol) p-dibromobenzene in 10 mL NMP was added to the mixture. The mixture was heated to about 195° C. for about 40 minutes.

The compound 4-(4'-bromophenylthio)bromobenzene was used in the preparation of the initiator 4-(4"-bromophenylthio-4'-phenylthio)phenylamine. The compound 4-(4'-bromophenylthio)bromobenzene was prepared by dissolving 24.60 g (132 mmol) phenyl sulfide in 200 mL carbon tetrachloride at 0° C. A solution of Br$_2$ in 64 mL carbon tetrachloride was added to the reaction mixture over a period of 90 minutes. The temperature was maintained between 10°-20° C. Evolving hydrogen bromide was neutralized in a trap containing sodium hydroxide solution. Product was recrystallized from ethyl alcohol 3 times, to give a yield of 52.8%.

The initiator 4-(4"-bromophenylthio-4'-phenylthio)phenylamine was prepared by charging 1.39 g (11.10 mmol) 4-aminothiophenol, 18.00 g (52.32 mmol) 4-(4'-bromophenylthio)bromobenzene (prepared as described above), 0.594 g (11.00 mmol) sodium acetate, and 50 mL NMP to a clean stirred reactor. The reactor was heated to 110° C. and 10 mL water were added. Heating was continued until the sodium acetate dissolved. Ten mL NMP was added and the reaction was distilled until the temperature reached 198° C. The reaction mixture was then refluxed for 1 hour.

Other initiators employed in Example 1 were commercially available.

The inventive arylene sulfide polymers having non-equivalent end groups were prepared in the following manner. Initiator, halothiophenol monomer, sodium hydroxide, sodium acetate, water, and N-methyl-2-pyrrolidone were combined in a stirred stainless steel reactor under an argon atmosphere, and heated to a predetermined temperature and held for 3 hours. The reactor was allowed to cool to room temperature over several hours. The reaction mixture was removed from the reactor, slurried in two volumes of deionized water, and filtered in a centrifugal filtration apparatus. In the filter the polymer was washed 20 minutes with an aqueous solution of sodium hydroxide, then washed 20 minutes with aqueous acetic acid, and then rinsed 1 hour with deionized water. The polymer was then dried at reduced pressure at 80° C. to yield poly(phenylene sulfide) as a white powder.

An elemental analysis was run on the polymer of Run 101 giving results of 63.53 wt. % C, 3.68 wt. % H, 1.20 wt. % N, and 24.16 wt. % S, which are consistent with theoretical results for an amino-functional poly(phenylene sulfide) having non-equivalent end groups of 62.92 wt. % C, 3.70 wt. % H, 1.22 wt. % N, and 25.19 wt. % S. Infra red analysis also produced an absorption consistent with an —NH$_2$ end group for the polymer of Run 101. GPC data indicated a molecular weight of 4,600 for the same run.

The reagents employed, conditions, and yield are indicated in Table 1.

Init. represents the mmoles of initiator.
Monomer is the mmoles of monomer.
Base represents the mmoles of sodium hydroxide.
Acetate represents the mmoles of sodium acetate.
H$_2$O represents the mmoles of water.
NMP is the mmol of NMP employed.
Temp. is the reaction temperature in °C.
Yield is the grams of polymer recovered from the reaction mixture.

TABLE 1

| Run | Init. (mmol) | Monomer (mmol) | Base (mmol) | Acetate (mmol) | H$_2$O (mmol) | NMP (mmol) | Temp. (°C.) | Yield (g) |
|---|---|---|---|---|---|---|---|---|
| 101 | 5.35 a | 42.8 f | 85.7 | 14.5 | 23 | 1000 | 200 | 5.40 |
| 102 | 2.06 b | 35.0 f | 70.0 | 70.0 | 140 | 840 | 200 | 4.39 |
| 103 | 1.46 b | 68.7 f | 75.6 | 20.6 | 440 | 1400 | 180 | 6.33 |
| 104 | 5.15 b | 36.0 g | 72.2 | 72.1 | 144 | 865 | 260 | 5.51 |
| 105 | 2.74 c | 52.0 f | 107 | 104 | 208 | 1250 | 215 | 4.74 |
| 106 | 2.22 d | 42.1 f | 86.5 | 84.3 | 169 | 1000 | 200 | 3.97 | a 4-(4'-bromophenylthio)phenylamine initiator
b 4-(4"-bromophenylthio-4'-phenylthio)phenylamine initiator
c p-bromobenzoic acid initiator
d p-iodobenzoic acid initiator
f p-bromothiophenol monomer
g p-chlorothiophenol monomer Table 1 demonstrates the preparation of arylene sulfide polymers having non-equivalent end groups using various reagents and conditions.

EXAMPLE II

Example II demonstrates the effectiveness of amino-functional poly(phenylene sulfide) produced by the inventive process in improving the mechanical properties of poly(phenylene sulfide) and nylon blends. Blends of nylon-6,6 and poly(phenylene sulfide) were prepared in a twin screw extruder at a temperature of 300° C. and a screw speed of 120 rpm. The pellets were injection molded and tested for unnotched Izod impact strength according to ASTM D 256.

Amino-functional poly(phenylene sulfide) was prepared by charging 2.68 g (6.90 mmol) 4-(4''-bromophenylthio-4'-phenylthio)phenylamine; 87.44 g (462.43 mmol) 4-bromothiophenol; 32.37 g (809.24 mmol) sodium hydroxide; 56.90 g (693.64 mmol) sodium acetate; 19.42 g (1,079 mmol) water; and 642 g (6,474 mmol) NMP to a clean stirred reactor. The reactor was heated to 220° C. and held for 1 hour. The temperature was increased to 260° C. and held for 3 hours. The reactor was allowed to cool and the reaction mixture was removed from the reactor, slurried in two volumes of deionized water, and filtered in a centrifugal filtration apparatus. In the filter the polymer was washed 20 minutes with aqueous NaOH, then washed 20 minutes with aqueous acetic acid, and then rinsed 1 hour with deionized water. The polymer was then dried at reduced pressure at 80° C. to yield amino-functional poly(phenylene sulfide).

Poly(phenylene sulfide) containing no amino-functional radical was prepared by charging 1.123 kg-moles sodium hydrosulfide, 1.090 kg-moles sodium hydroxide, 1.098 kg-moles p-dichlorobenzene, 0.37 kg-moles sodium acetate, and 3.33 kg-moles N-methyl-2-pyrrolidone (NMP) to a stirred reactor. The reactor was heated to 225° C. and held for 5 hours. The temperature was then increased to 270° C. and held for 3 hours. The reaction mixture was quenched with NMP and the solid product was washed with water and an aqueous solution of calcium acetate.

The results and compositions are described in Table 2. In Table 2, nylon is the grams of nylon 6,6 used in the blend. PPS is the grams of poly(phenylene sulfide) used in the polymer blend. PPS-NH$_2$ is the grams of amino-functional poly(phenylene sulfide) used in the polymer blend. The unnotched Izod impact test was run according to ASTM D 256.

TABLE 2

| Run | Nylon (grams) | PPS (grams) | PPS-NH$_2$ (grams) | Unnotched Izod Impact (Ft-lb/in) |
|---|---|---|---|---|
| 201 | 900 | 100 | 0 | 11.85 |
| 202 | 900 | 100 | 20 | 26.62 |
| 203 | 100 | 900 | 0 | 8.98 |
| 204 | 100 | 900 | 20 | 10.32 |

Table 2 demonstrates the improvement in mechanical strength of the polymer blend containing the amino-functional poly(phenylene sulfide) compared to the polymer blend without such groups. Run 202 was especially effective, with an improvement in the Izod impact strength by a factor of 2.25.

While this invention has been described in detail for the purpose of illustration, it is not to be construed as limited thereby, but is intended to cover all changes and modification within the spirit and scope thereof.

That which is claimed is:

1. A process for producing arylene sulfide polymers comprising:
    contacting an initiator compound, a halothiophenol compound, a polar organic compound, and a base at polymerization conditions;
    wherein said initiator compound is represented by the formula XR(RS)$_n$Y, where R is a divalent hydrocarbon radical selected from the group consisting of arylene, alkyl-substituted arylene, cycloalkyl substituted arylene, and aryl substituted arylene radicals having 6 to 24 carbon atoms; n is 1–5; X is a halogen selected from the group consisting of fluorine, chlorine, bromine, and iodine; and Y is —NH$_2$;
    wherein said halothiophenol is represented by the formula XR'SH, where R' is a divalent hydrocarbon radical selected from the group consisting of arylene, alkyl-substituted arylene, cycloalkyl substituted arylene, and aryl substituted arylene radicals having 6 to 24 carbon atoms and X is a halogen selected from the group consisting of fluorine, chlorine, bromine, and iodine; and
    said base is selected from the group consisting of alkali metal hydroxides, alkali metal carbonates, and mixtures thereof.

2. A process according to claim 1 wherein said initiator compound is 4-(4'-bromophenylthio)phenylamine or 4-(4''-bromophenylthio-4'-phenylthio)phenylamine.

3. A process according to claim 1 wherein said initiator compound is present in an amount in the range of from about 0.001 to about 2 moles of initiator compound per mole of halothiophenol monomer.

4. A process according to claim 3 wherein said initiator compound is present in an amount in the range of from 0.01 to 1.5 moles of initiator compound per mole of halothiophenol monomer.

5. A process according to claim 1 wherein said halothiophenol is a chloro- or bromo-thiophenol.

6. A process according to claim 5 wherein said halothiophenol is 1-bromo-4-mercaptobenzene or 1-chloro-4-mercaptobenzene.

7. A process according to claim 1 wherein said polar organic compound is an organic amide.

8. A process according to claim 7 wherein said polar organic compound is N-methyl-2-pyrrolidone.

9. A process according to claim 1 further comprising contacting an alkali metal carboxylate represented by the formula R''(CO$_2$M)$_n$ where R'' is a hydrocarbyl radical selected from alkyl, cycloalkyl, aryl, and alkaryl, said hydrocarbyl radical having 1 to 20 carbon atoms, n is a number from 1–2, and M is an alkali metal selected from the group consisting of lithium, sodium, potassium, rubidium, and cesium.

10. A process according to claim 9 wherein said alkali metal carboxylate is an alkali metal acetate.

11. A process according to claim 1 wherein said contacting is conducted at a temperature in the range of from about 125° C. to about 450° C.

12. A process according to claim 11 wherein said contacting is conducted at a temperature in the range of from 175° C. to 350° C.

13. A process for producing arylene sulfide polymers comprising:
    contacting 4-(4''-bromophenylthio-4'-phenylthio)-phenylamine, 1-bromo-4-mercaptobenzene, N-methyl-2-pyrrolidone, and sodium hydroxide at a temperature in the range of from 175° C. to 350° C.

14. A process according to claim 13 further comprising contacting an alkali metal carboxylate.

15. A process according to claim 13 wherein said alkali metal carboxylate is sodium acetate.

* * * * *